United States Patent
Trebbi

(10) Patent No.: US 7,395,777 B2
(45) Date of Patent: Jul. 8, 2008

(54) MACHINE FOR THE TREATMENT OF PHARMACEUTICAL PRODUCTS

(75) Inventor: Roberto Trebbi, Castenaso (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 316 days.

(21) Appl. No.: 10/542,954

(22) PCT Filed: Feb. 3, 2004

(86) PCT No.: PCT/IB2004/000296

§ 371 (c)(1),
(2), (4) Date: Jul. 21, 2005

(87) PCT Pub. No.: WO2004/069130

PCT Pub. Date: Aug. 19, 2004

(65) Prior Publication Data

US 2006/0124053 A1    Jun. 15, 2006

(30) Foreign Application Priority Data

Feb. 6, 2003    (IT)    ............................ BO2003A0050

(51) Int. Cl.
*B05C 3/08*    (2006.01)
*B05C 5/02*    (2006.01)

(52) U.S. Cl. .................... 118/19; 118/303; 118/320; 118/418

(58) Field of Classification Search .................... 118/19, 118/320, 418, 303; 427/242, 2.18; 366/192, 366/175.1, 180.1, 182.4, 187, 227; 99/348, 99/494, 535; 34/599

See application file for complete search history.

(56) References Cited

U.S. PATENT DOCUMENTS 2,986,475 A    5/1961    Mesnard et al.

(Continued)

FOREIGN PATENT DOCUMENTS

EP    0 362 888 A1    4/1990

(Continued)

*Primary Examiner*—Laura Edwards
(74) *Attorney, Agent, or Firm*—Arent Fox LLP

(57) ABSTRACT

A machine (100) for the treatment of pharmaceutical products (P) comprises a pan (2) that revolves about an axis of rotation (X) and a dispensing unit (3) designed to disperse a coating material inside the pan (2) over a mass (M) of the products (P) located in the pan (2). The pan (2) has an opening (7) for feeding the products to be treated (P) into the pan (2), and an opening (8) for feeding the products (PT) already treated with the coating material out of the pan (2), the infeed opening (7) and the outfeed opening (8) being separate and independent of each other. A portion (K) of the inside surface of the pan (2) is equipped with at least one helical flow regulating fin (4, 5, 6) designed to facilitate inflow (F3) of the products to be treated (P) into the pan (2) during the feeding of the products (P) into the pan (2) through the infeed opening (7) when the pan (2) itself revolves in a first direction of rotation (FI), and to cause outflow (F4) of the treated products (PT) from the pan (2) during the outfeed of the treated products (PT) from the pan (2) through the outfeed opening (8) when the pan (2) itself revolves in a second direction of rotation (F2), opposite to the first direction of rotation (F1).

20 Claims, 3 Drawing Sheets

U.S. PATENT DOCUMENTS

| | | | | |
|---|---|---|---|---|
| 3,606,860 A | * | 9/1971 | Dunn, Jr. | 118/61 |
| T927,005 I4 | * | 10/1974 | Blouin | 427/212 |
| 4,421,020 A | * | 12/1983 | Gross | 99/472 |
| 5,495,418 A | | 2/1996 | Latini et al. | |
| 6,769,381 B2 | * | 8/2004 | Burke et al. | 118/13 |

FOREIGN PATENT DOCUMENTS

| | | |
|---|---|---|
| EP | 0 504 773 A | 9/1992 |
| FR | 726959 A | 6/1932 |
| FR | 1 262 239 A | 5/1961 |
| FR | 2 251 270 A | 6/1975 |

* cited by examiner

MACHINE FOR THE TREATMENT OF PHARMACEUTICAL PRODUCTS

CROSS-REFERENCE TO RELATED APPLICATION

This application is a National Stage entry of International Application No. PCT/IB2004/000296, filed Feb. 3, 2004, the entire specification claims and drawings of which are incorporated herewith by reference.

TECHNICAL FIELD

The present invention relates to a machine for the treatment of products, in particular pharmaceutical products.

In particular, the invention relates to a coating machine used to apply a coating to pharmaceutical products, such as tablets or capsules, to which the present specification refers but without thereby restricting the scope of the invention.

BACKGROUND ART

At present, a conventional machine for coating pharmaceutical products comprises a hollow pan that revolves about a horizontal axis and is known in the trade by the term "Pellegrini coating pan", which will herein be referred to simply as "coating pan".

At the front of it, the coating pan has a central, circular opening through which the pharmaceutical products are fed into the pan from a reservoir, and a plurality of nozzles, mounted on an arm extending in a direction substantially parallel to the axis of rotation of the pan and designed to spray a coating liquid towards and over a mass of pharmaceutical products to be treated, lying centrally inside the pan and coming from the reservoir through the central opening.

At present, the inside walls of the coating pan are preferably equipped with a plurality of inclined baffles protruding radially from the walls themselves. These baffles facilitate uniform distribution of the mass of products not only while the coating pan rotates clockwise about its axis as the products to be treated are fed into it but also while the coating pan rotates in the opposite direction as the treated product is fed out of the coating pan into a container placed at the central opening beforehand.

A major drawback in a coating machine of this kind is that the pan has a single opening for infeed of the untreated product still to be treated, as well as for outfeed of the treated product. This creates a potential risk of contamination between incoming and outgoing products, especially when there is a change to a different type of coating material.

The present invention has for an object to provide a machine for treating pharmaceutical products that overcomes the above mentioned drawback.

Another object of the present invention is to provide a coating machine that makes the treatment of the pharmaceutical products as safe and rational as possible and that also permits rapid cleaning and sterilising of the coating pan.

DISCLOSURE OF THE INVENTION

The invention accordingly provides a machine for the treatment of pharmaceutical products, comprising a pan that revolves about an axis of rotation and a dispensing unit designed to disperse a coating material inside the pan over a mass of the products located in the pan; the machine being characterised in that the pan has an opening for feeding the products to be treated into the pan, and an opening for feeding the products already treated with the coating material out of the pan, the infeed opening and the outfeed opening being separate and independent of each other; a portion of the inside surface of the pan being equipped with at least one helical flow regulating fin designed to facilitate inflow of the products to be treated into the pan during the feeding of the products into the pan through the infeed opening when the pan itself revolves in a first direction of rotation, and to cause outflow of the treated products from the pan during the outfeed of the treated products from the pan through the outfeed opening when the pan itself revolves in a second direction of rotation, opposite to the first direction of rotation.

DESCRIPTION OF THE DRAWINGS

The technical characteristics of the invention are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF THE PREFERRED EMBODIMENTS OF THE INVENTION

Figure 1:
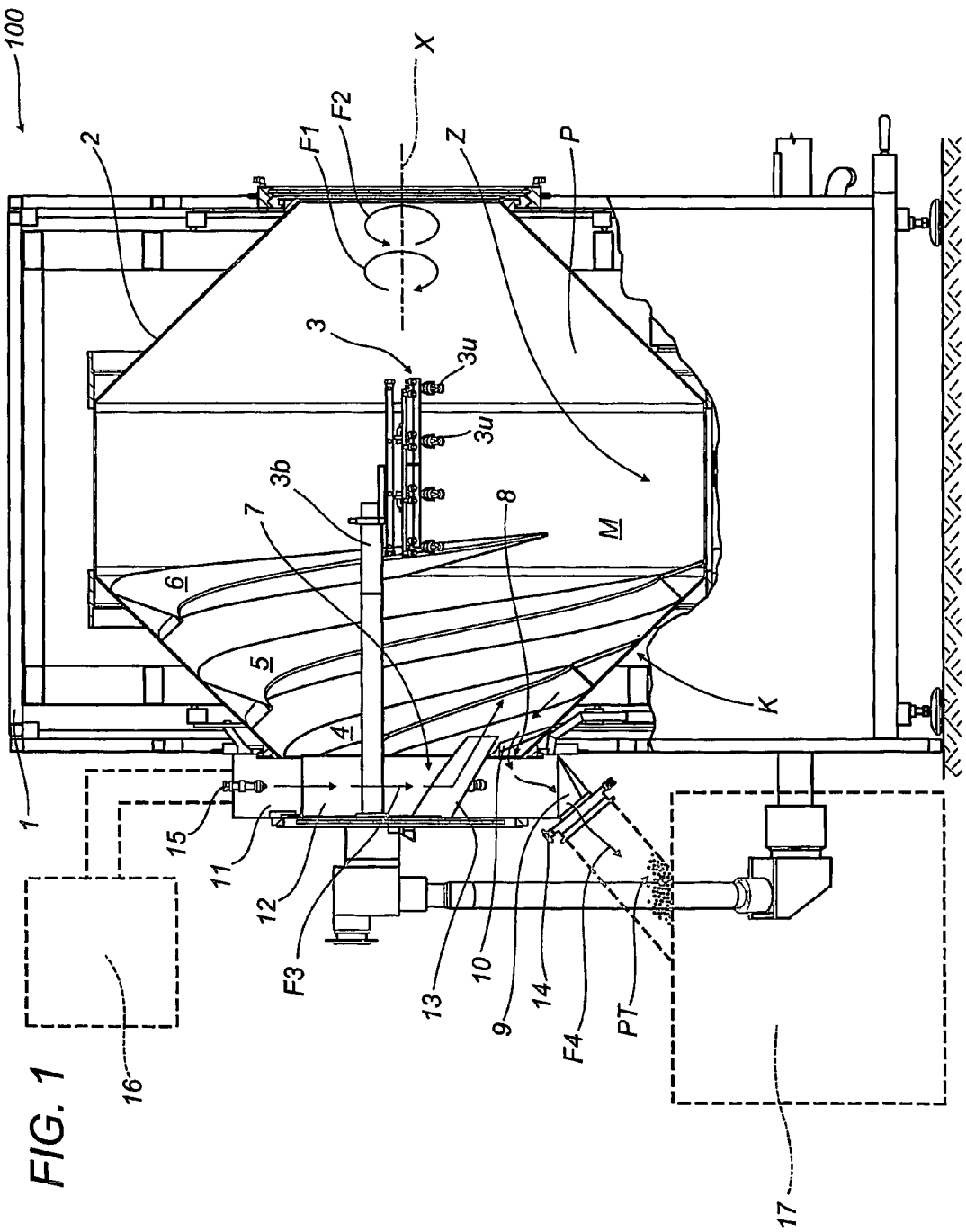
FIG. 1 is a side view, partly in cross section and with some parts cut away for clarity, of a preferred embodiment of the machine according to the invention for the treatment of products.

With reference to FIG. 1, the numeral 100 denotes in its entirety a machine for coating pharmaceutical products P, such as, for example, tablets or capsules.

The machine 100 comprises a supporting frame 1, a pan 2 mounted on the supporting frame 1 in such a way that it can be rotationally driven about an axis X by a customary motor, which is not illustrated, and a dispensing unit 3 which, during use, is positioned inside the pan 2 in order to dispense and disperse, preferably by spraying, a coating liquid over a mass M of products P located in a substantially central zone Z inside the pan 2.

Figure 2:
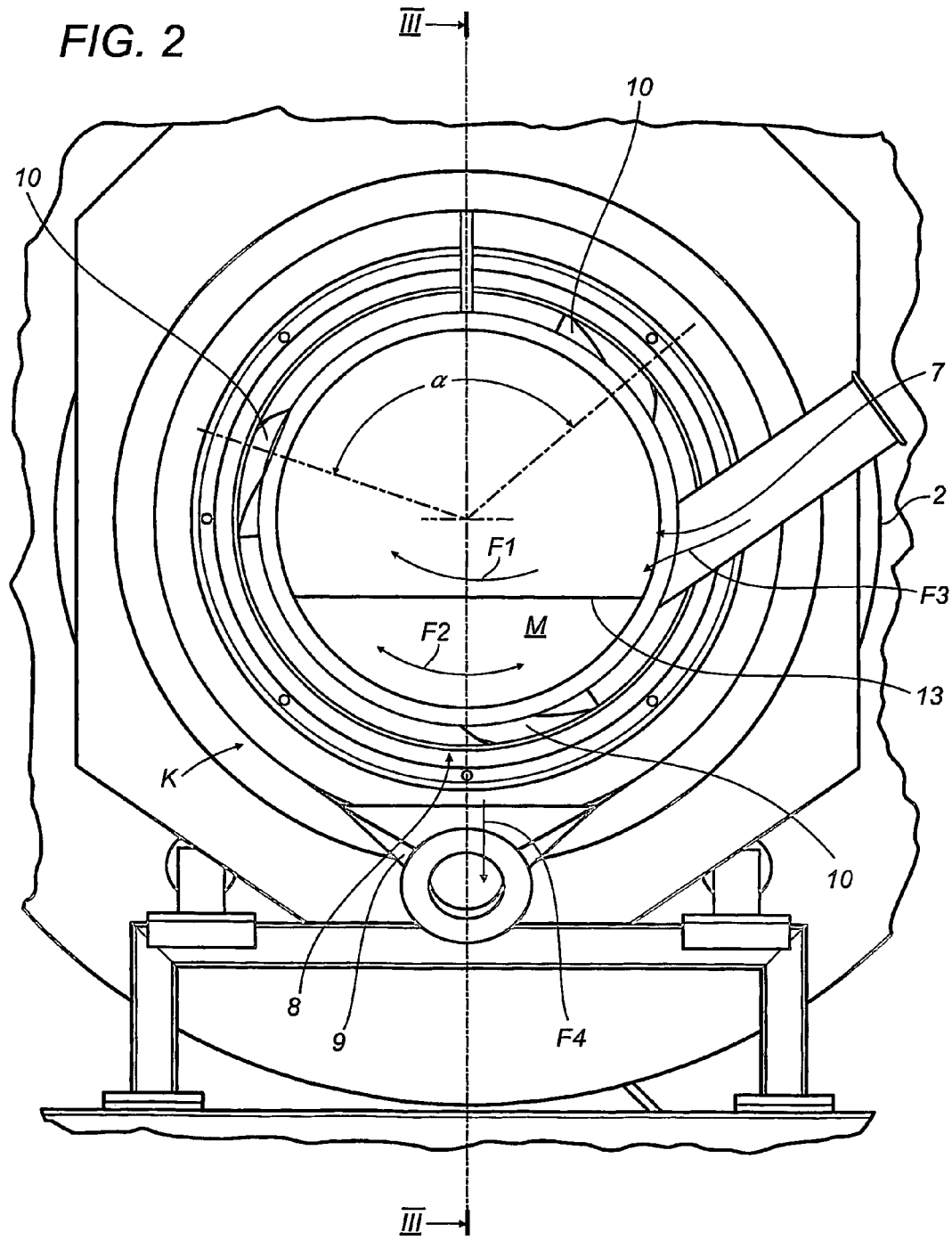
FIG. 2 is a schematic front view of a detail from the machine of FIG. 1.
Figure 3:
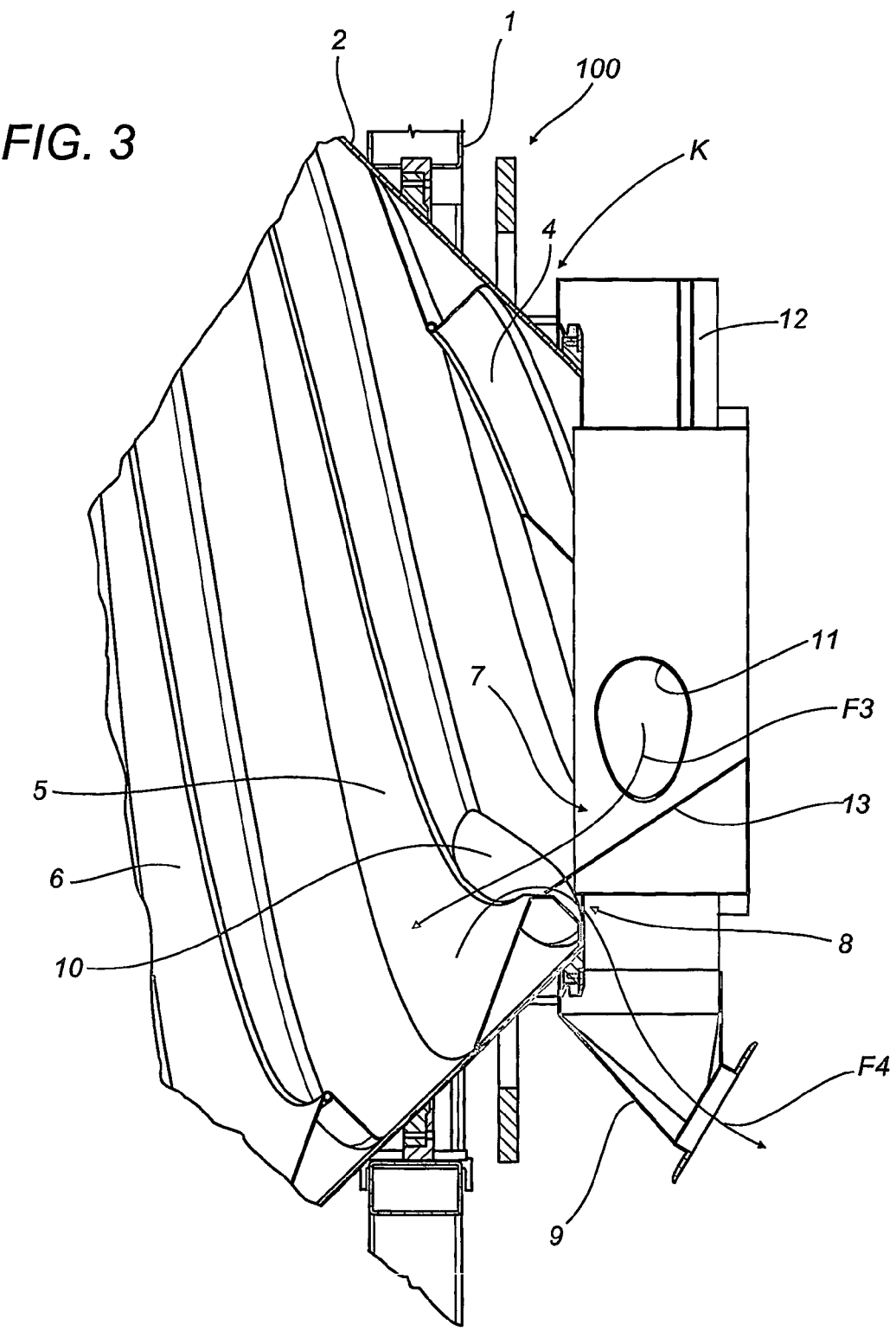
FIG. 3 is a plane vertical section of the detail of FIG. 2.

As illustrated in FIGS. 1, 2 and 3, a substantially truncated cone shaped front portion K of the inside surface of the pan 2 is equipped with first, second and third flow regulating fins 4, 5, and 6, which are preferably equally spaced and defined by cuspate profiles with triangular cross sections whose base is joined smoothly to the inside surface of the pan 2, and which extend in sequence along the truncated cone shaped portion of the inside surface in a substantially helical direction.

During use, the first, second and third flow regulating fins 4, 5 and 6 are designed to facilitate inflow towards the zone Z of the pan 2 (in the direction indicated by the arrow F3 in FIGS. 2 and 3) of the untreated product P fed through a first infeed opening or inlet 7 of the pan 2 while the pan 2 revolves about the axis X in a first direction of rotation F1 (clockwise in FIG. 2), and to cause outflow (in the direction indicated by the arrow F4 in FIGS. 2 and 3) of the treated or coated product PT towards the outside of the pan 2, through an outfeed opening or outlet 8, located below the infeed opening 7 in a position separate and independent of the latter, while the pan 2 itself revolves about the axis X in a second direction of rotation F2 (anti-clockwise in FIG. 2), opposite to the first direction of rotation F1.

As shown in FIG. 1, the dispensing device 3 comprises a plurality of nozzles 3u appropriately directed inside the pan 2 to cover the zone Z.

The nozzles 3u are mounted on a horizontal arm 3b, substantially parallel to the axis of rotation X of the pan 2 and protruding from the pan 2.

Inside the arm 3b there are conduits for supplying the coating liquid, these conduits being connected to a feed tank (of customary type and therefore not illustrated) located outside the pan 2.

As illustrated in more detail in FIGS. 2 and 3, the outfeed opening 8 has the shape of a ring made on a circumferential area of the pan 2 and being larger in diameter than the circumferential area on which the infeed opening 7, also having the shape of a ring, is made, so that the infeed opening 7 is positioned above and to one side of the outfeed opening 8.

The outfeed opening 8 is connected to a conduit 9, made under the infeed opening 7 with respect to a horizontal plane of the coating machine 100, on a protrusion 12 of the frame 1, and defines a tubular channel through which the products PT from the outfeed opening 8 are conveyed to the outside.

The tubular conduit 9 is equipped with a shutoff valve 14 that seals the outside end of the conduit 9 itself.

Similarly, the infeed opening 7 comprises an access conduit 11 made on the protrusion 12 and positioned above the conduit 9.

The conduit 11 leads onto an inclined surface 13 (FIG. 3) that extends to an area close to the inside of the pan 2 and partially covers the outfeed opening 8.

The conduit 11 is also equipped with a shutoff valve 15 that seals the outside end of the conduit 11 itself.

Further, the two conduits 11 and 9 are connected to separate reservoirs 16 and 17 (shown schematically by the dashed lines in FIG. 1) for feeding the product to be treated P and collecting the treated product PT, respectively.

As shown in more detail in FIG. 2, close to the outfeed opening 8 there is a guide element 10 that is joined smoothly to the profile of each fin 4, 5 and 6, for feeding out the treated product PT.

Preferably, there are at least three guide elements 10 separated from each other by equal angular intervals α and each consisting of a chute facing the outfeed opening 8.

More specifically, the three guide elements 10 are separated from each other by equal angular intervals α of approximately 120°.

As illustrated in FIG. 3, the area adjacent to the treated product PT outfeed opening 8, close to the product P infeed area, is partly covered by the inclined surface 13: this architecture keeps the openings 7 and 8 well isolated from each other during the steps of feeding in the product to be treated P and of feeding out the treated product PT, thus eliminating the risk of contamination between the incoming products P and the coated products PT feeding out of the pan 2 of the machine 100.

The machine constructed as described above therefore achieves the aforementioned aims thanks to its extremely simple structure, with a rapid production cycle made possible by two independent reservoirs, one for feeding the product in and the other for collecting the treated product fed out.

Moreover, the machine 100 can advantageously perform cycles for cleaning or sterilising the inside surface of the pan while the pan itself continues to revolve. This is made possible by the fact that the conduits leading into and out of the pan can be sealed off and are totally independent of and separate from each other. This saves considerable time between one production cycle and the next.

Other advantages are derived from the constructional architecture of the fins, which have triangular cuspate profiles with smooth, rounded edges which facilitate product flow and prevent product accumulations or "shadow areas", that is to say, parts of the inside surface of the pan where the coating liquid is not properly dispersed.

It will be understood that the coating machine described can be modified and adapted in several ways without thereby departing from the scope of the inventive concept. Moreover, all the details of the machine may be substituted by technically equivalent elements.

The invention claimed is:

1. A machine (100) for the treatment of pharmaceutical products (P) comprising a pan (2) that revolves about an axis of rotation (X) and a dispensing unit (3) designed to disperse a coating material inside the pan (2) over a mass (M) of the products (P) located in the pan (2); the machine (100) being characterised in that the pan (2) has an opening (7) for feeding the products to be treated (P) into the pan (2), and an opening (8) for feeding the products (PT) already treated with the coating material out of the pan, the infeed opening (7) and the outfeed opening (8) being separate and independent of each other; a truncated cone shaped front portion (K) of the inside surface of the pan (2) being equipped with at least one helical flow regulating fin (4, 5, 6) extending along the whole truncated cone shaped front portion of the inside surface in a respective helical direction and designed to facilitate inflow (F3) of the products to be treated (P) into the pan (2) during the feeding of the products (P) into the pan (2) through the infeed opening (7) when the pan (2) itself revolves in a first direction of rotation (F1), and to cause outflow (F4) of the treated products (PT) from the pan (2) during the outfeed of the treated products (PT) from the pan (2) through the outfeed opening (8) when the pan (2) itself revolves in a second direction of rotation (F2), opposite to the first direction of rotation (F1).

2. The machine according to claim 1, characterised in that the infeed opening (7) in the pan (2) is located in a position above and to one side of the outfeed opening (8).

3. The machine according to claim 1, characterised in that the flow regulating fin (4, 5, 6) has a substantially cuspate profile with a triangular cross section whose base is joined smoothly to the inside surface of the pan (2).

4. The machine according to claim 3, characterised in that at the outfeed opening (8) there is at least one chute-like guide element (10) that is joined smoothly to the profile of the fin (4, 5, 6).

5. The machine according to claim 1 characterised in that there are multiple flow regulating fins and the flow regulating fins (4, 5, 6) on the portion (K) are equally spaced from each other.

6. The machine according to claim 5, characterised in that at the outfeed opening three chute-like guide elements (10) are provided separated from each other by equal defined angular intervals (α), each guide element (10) being joined smoothly to the profile of a respective flow regulating fin (4; 5; 6).

7. The machine according to claim 6, characterised in that the three guide elements (10) are separated from each other by angular intervals (α) of approximately 120°.

8. The machine according to claim 1, characterised in that the infeed opening (7) comprises an access conduit (11) for access from the outside, made on a protrusion (12) on the pan (2) and leading onto an inclined surface (13) that extends to an area close to the inside of the pan (2) and partially covers the outfeed opening (8).

9. The machine according to claim 1, characterised in that the outfeed opening (8) comprises a tubular conduit (9) leading to the outside and made on a protrusion (12) of the pan (2).

10. The machine according to claim 9, characterised in that the conduit (9) is equipped with a sealed shutoff valve (14).

11. The machine according to claim 8, characterised in that the access conduit (11) is equipped with a sealed shutoff valve (15).

12. The machine according to claim 1, characterised in that the infeed opening (7) and the outfeed opening (8) are connected to separate reservoirs (16, 17) for feeding the product to be treated (P) and collecting the treated product (PT), respectively.

13. The machine according to claim 2, characterised in that the flow regulating fin (4, 5, 6) has a substantially cuspate profile with a triangular cross section whose base is joined smoothly to the inside surface of the pan (2).

14. The machine according to claim 13, characterised in that at the outfeed opening (8) there is at least one chute-like guide element (10) that is joined smoothly to the profile of the fin (4, 5, 6).

15. The machine according to claim 8, characterised in that the outfeed opening (8) comprises a tubular conduit (9) leading to the outside and made on a protrusion (12) of the pan (2).

16. The machine according to claim 15, characterised in that the conduit (9) is equipped with a sealed shutoff valve (14).

17. The machine according to claim 9, characterised in that an access conduit (11) is equipped with a sealed shutoff valve (15).

18. The machine according to claim 15, characterised in that the access conduit (11) is equipped with a sealed shutoff valve (15).

19. The machine according to claim 10, characterised in that an access conduit (11) is equipped with a sealed shutoff valve (15).

20. The machine according to claim 16, characterised in that the access conduit (11) is equipped with a sealed shutoff valve (15).

* * * * *